Jan. 27, 1953  R. W. BROWN  2,626,522
APPARATUS FOR MEASURING THE MODULUS OF
COMPRESSION OF RUBBERLIKE MATERIAL
Filed Oct. 7, 1948
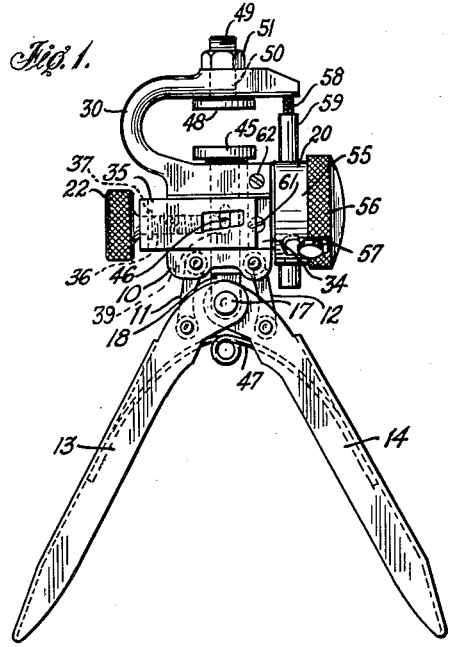
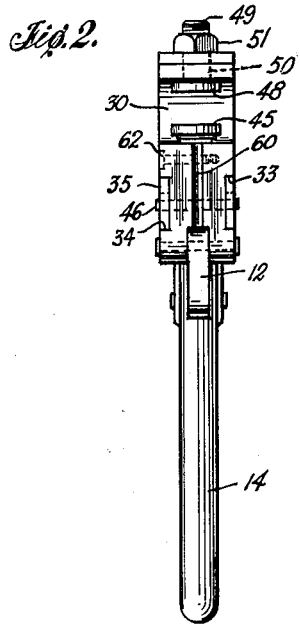
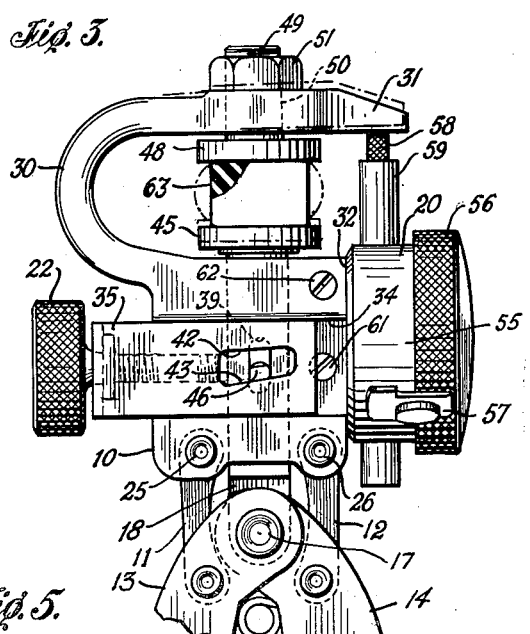
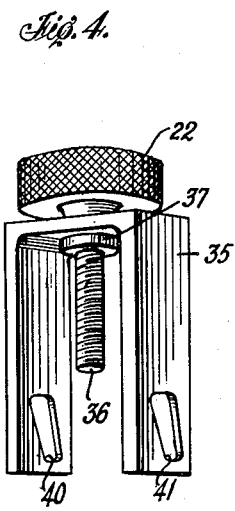
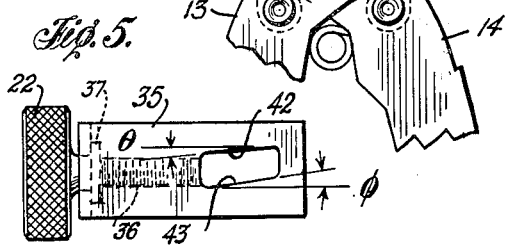
INVENTOR.
ROY W. BROWN
BY
Ely & Frye
ATTORNEYS Patented Jan. 27, 1953

2,626,522

UNITED STATES PATENT OFFICE 2,626,522

APPARATUS FOR MEASURING THE MODULUS OF COMPRESSION OF RUBBERLIKE MATERIAL

Roy W. Brown, Akron, Ohio, assignor to The Firestone Tire & Rubber Company, Akron, Ohio, a corporation of Ohio Application October 7, 1948, Serial No. 53,199

6 Claims. (Cl. 73—94)

A primary object of the invention resides in the provision of an improved device for conveniently measuring the modulus of compression of a test sample of rubber or rubberlike material.

While it is known to measure compressive resistances of compressible material by employing the forces resisting compression in a manner to displace an elastic member such as a spring to an extent below the elastic limit of said member and measuring the magnitude of displacement as indicative of the modulus of the material so measured, the manner in which prior art devices accomplish this result involved rather cumbersome structures which neither conveniently fit in the average tool kit, nor can conveniently be carried on the person of the user.

It is therefore a primary object of the invention to provide an improved compression modulus testing device of dimensions comparable to other hand tools such as ordinary pliers.

A further object of the invention is to provide an improved testing device of the above-mentioned type having incorporated therein a readily adjustable means for obtaining an accurate zero dial setting for pellets of the material to be tested, regardless of dimensional variations of the pellets, within certain limitations.

A further object of the invention is to provide an improved portable apparatus for obtaining compression modulus tests, adapted for manual operation in a manner similar to pliers but with means incorporated therein segregating the indicating mechanism from the force applying mechanism.

A further object of the invention resides in the provision of a convenient hand-operable testing device for carrying out the aforesaid method.

The invention has for a further object the provision of an improved portable compression modulus testing apparatus incorporating a minimum of mechanical structure and requiring only two simple adjustments to obtain a correct zero adjustment for samples varying in thickness within certain tolerances.

Another object of the invention is generally to improve and simplify compression modulus measuring apparatus of the type wherein compressive resistances are utilized to indicate the modulus value.

Other objects and advantages will become apparent to persons skilled in the art upon an examination of the drawings, the specification, and the claims appended thereto.

In the drawings, in which like parts are identified by the same reference numerals, Fig. 1 is a side elevational view of a device incorporating the invention;

Fig. 2 is an end elevational view of the device of Fig. 1 with the dial type micrometer shown in Fig. 1 removed to best show the construction of the device;

Fig. 3 is an enlarged fragmentary view, in elevation, of the head portion of the device of Fig. 1;

Fig. 4 is a perspective view of the U-shaped compression limiting element provided with diagonally disposed limiting slots and a manually operable screw element associated therewith.

Fig. 5 is a side elevational view of the limiting element of Fig. 4.

As best shown in Fig. 1, the device comprises generally a clamp type frame member 10 from which a pair of links 11 and 12 depend to pivotally engage handle members 13 and 14, the upper ends of said handle members being pivotally joined at 17 to a reciprocable rod 18; an integral extension of said frame member defining a C-clamp configuration; a manually operable disc type compression member; a fixed compression member; and a limiting element controllable through knurled knob 22.

Referring to Fig. 3, frame member 10 includes a lower portion to which links 11 and 12 are pivoted at pintle points 25 and 26, for example by rivet pins, and an upper C-clamp portion 30 comprising an integral extension of lower portion 10, doubled back to provide a free end portion 31 which overhangs the right margin 32 of member 10. The frame member is provided with a pair of aligned lateral grooves 33 and 34, Fig. 2, in which a U-shaped element 35, Fig. 4, is disposed for slidable adjustment therein as controlled by knurled knob 22, mounted on a screw element 36. Element 36 is provided with an integral collar 37 for abutment with the end wall of U-shaped element 35, knob 22 being secured to element 36 on the opposite side of the end wall to provide a journal connection between the two elements permitting rotational movement of screw element 36 while preventing axial movement therebetween. Element 36 threadedly engages a bore provided in member 10, hence rotation of knurled knob 22 effects lateral adjustment of the limiting slots 40 and 41 of U-shaped member 35.

Returning to Fig. 3, rod 18 extends through a vertical complementary bore provided centrally of the base portion of frame member 10. A piston-like compression member 45, which may be integral with rod 18, is carried at the upper end of the rod for movement along a vertical axis in response to actuation of handles 13 and 14 which in turn effects displacement of the ends of the handles joining pintle 17 in a toggle action by reason of the associated tying links 11 and 12. Rod 18 is provided at a suitable point intermediate member 45 and pintle 17, with a diametrically disposed pin 46 in pressed fit relation thereto, with portions thereof extending through suitable slots through the side walls of frame member 10, as shown dotted at 39, and into slots 40 and 41 of U-shaped member 35. The extending portions of pin 46 are diagonally flattened to present diagonal surfaces, each aligned with the respective diagonal margins of slots 40 and 41 to be engaged thereby to limit both the upward and downward movement of rod 18, the extent of such limited movements being readily varied by the transverse movement of member 35 effected through actuation of knurled knob 22.

As best shown in Fig. 5, margins 42 and 43 of slots 40 and 41 are not in parallel relation, angle $\theta$ being smaller than angle $\phi$. In the device shown, angle $\theta$ may be 4° 50', with angle $\phi$ 6° 20' to produce slots 40 and 41 which are slightly convergent toward the right as viewed. The angular relation existing between slot margins 42 and 43 compensates for sample pellets of varying length in a manner to insure a fixed percentage of compression, for example 20%, independently of the setting of limiting member 35. As slots 40 and 41 move to the left as viewed, pin 46 is raised, reducing the space between compression members 45 and 48 at full retraction, but the slots are reduced proportionately in width to limit upward movement of member 45 during a compression operation, to 20% of the full retraction spacing between the compression members.

As shown in Fig. 1, a generally U-shaped compression spring 47 is positioned in biased engagement with the inner surfaces of handles 13 and 14 to urge the handles to an open position wherein rod 18 is retracted. The C-clamp portion 30 of frame member 10 is provided with a fixed compression disc 48 corresponding in diameter with disc 45 and bolted to the C-clamp portion by an integral threaded extension 49 extending through a complementary bore 50 and adapted to receive a nut 51.

A clock-faced micrometer 20, of a known type, including a case 55 containing the operating mechanism, a dial, not shown, rotationally adjustable by a knurled knob 56 retained in position by a detent 57, and an actuating plunger 58 housed for axial movement in protective sleeve 59, is provided at the rear face thereof with a mounting flange, not shown, adapted for complementary reception in a vertical slot 60, Fig. 2, and clamped therein by means of screws 61 and 62. Micrometer 20 is of the type wherein plunger 58 is biased in an outward direction with the indicator mechanism associated with the plunger in a manner to record plunger movements in both directions. Micrometer 20, and hence plunger 58, is positioned in respect to the underlying surface of free end portions 31 of C-clamp 30 to constrain the plunger near the bottom of its compression stroke with C-clamp portion 30 undistended. Distortion of the C-clamp portion, causing upward movement of the free end portion 31 thereof, allows plunger 58 to move vertically under bias with micrometer 20 measuring the actual distention of overhanging clamp portion 31 in respect to a vertical axis.

Operation of the device is as follows. A sample 63 of the material to be tested, in the form of a solid, right circular cylinder, is placed between compression members 45 and 48 coaxially therewith as shown in Fig. 3. Since certain tolerances are permitted as to the axial dimension of pellets to be tested, the device must of course be adjusted for a proper zero reading of micrometer 20 for each pellet. Prior to insertion of the pellet, handle elements 13 and 14 are placed in a position of maximum divergence with knurled knob 22 rotated to position the U-shaped limiting member 35 at its extreme limit of movement to the right, as viewed in Figs. 1 and 3. In this position of member 35, slots 40 and 41 are of course moved to the extreme right with pin 46 in abutment with the left end wall of the slots, which is the position of maximum piston retraction, hence maximum jaw opening between discs 45 and 48. The pellet is of a size to be easily inserted between discs 45 and 48 with disc 45 in the above defined retracted position, with the pellet in loose fit relation to the opposing surface of the discs.

A proper zero adjustment of micrometer 20 may now be obtained by movement of the limiting slot-containing member 35 to the left, as seen in Fig. 3, by means of adjusting knob 22 to raise rod 18 and hence disc 45 the required amount to effect a snug but non-compressing engagement between pellet 62 and confining compression members 45 and 48. Completion of this adjustment is followed by adjustment of the micrometer 20, through knurled knob 56, to indicate zero reading on the face thereof. Handles 13 and 14 are then brought to the limit of minimum divergence, which of course is controlled by movement of pin 46 from a position of engagement of the lower wall face of slots 40 and 41 to a position engaging the upper walls of the slots. Regardless of the position of these slots in respect to a horizontal plane, the permitted vertical displacement from any given zero adjustment is a fixed percentage of the distance, at full retraction, between the compression members due to the above mentioned angular relation existing between the diagonally disposed slot faces, hence disc 45 is thus moved from a position of snug but non-compressing contiguous engagement with pellet 63 to the dotted line position shown in Fig. 3, with the pellet compressed an amount equal to the dimensional difference between the width of slots 40, 41 and pin 46, through a vertical plane. In this compressed position the normally cylindrical pellet assumes a bulged configuration shown dotted in Fig. 3. Since disc 45 is in this manner actuated between two definite positions as limited by the movement of pin 46 in associated slots 40, 41, the device functions completely independent of the magnitude of pressure applied to insure the movement of disc 45 from the lower to the upper limit of movement thereof. The resulting inherent build-up of compressional forces within pellet 63 exerted equally on compression members 45 and 48 are solely of vertical components, as viewed in Fig. 3, hence the entire force, which is the measure of "springiness" or of the character of the material to resist deformation, is applied transversely of the C-clamp portion of the device with a resultant upward displacement of the upper arm of C-clamp portion 30, more specifically a vertical displacement of end portion 31, which is accurately recorded on micrometer 20.

Other modifications and adaptations of the invention described herein will become readily apparent to persons skilled in the art without departure from the scope of the invention, which is limited only by the following claims.

What is claimed is:

1. In a device of the character described, a frame member, a yieldable jaw projecting from said frame member and supported thereby, a fixed compression member positioned intermediate said frame member and said clamp element and supported by said jaw, a movable compression member slidably mounted on said frame member and including a plunger reciprocal along the axis of alignment of said compression member, lever means for reciprocation of said plunger, a limiting member slidably mounted on said frame member along an axis transverse to the axis of said plunger, said limiting element provided with an aperture defining margins diagonally disposed in respect to the said axis of said plunger, stop means carried by said plunger and projecting radially into the aperture of said limiting member, and manually operable means for the selective adjustment of said limiting member, whereby the extent of reciprocation of said plunger may be confined within limits determinable by the manual adjustment of said limiting member.

2. A device for measuring force at a given value of strain comprising a frame, an arm integral with the frame, overhanging the frame in spaced relation thereto and adapted to be deflected by the force of compression, a plunger carried by the frame in sliding relation with respect thereto and movable to and from said arm, means carried by the frame and adapted to urge said plunger toward said arm under manual pressure, means carried by said frame for indicating the amount of deflection of said arm, slide means carried by the frame and slidable transversely of said plunger, limit means on said slide means providing variable limits of travel of said plunger, and stop means carried by said plunger and engageable with said limit means.

3. A device for measuring force at a given value of strain comprising a frame, an arm integral with the frame, overhanging the frame in spaced relation thereto and adapted to be deflected by the force of compression, a plunger carried by the frame in sliding relation with respect thereto and movable to and from said arm, means carried by the frame and adapted to urge said plunger toward said arm under manual pressure, means carried by said frame for indicating the amount of deflection of said arm, slide means carried by the frame and slidable transversely of said plunger, limit means in said slide means providing variable limits of travel of said plunger, and stop means carried by said plunger and engageable with said limit means, said limit means comprising two non-parallel edges of a slot having two non-parallel edges extending transverse the direction of movement of said plunger.

4. A device for measuring force at a given value of strain comprising a frame, an arm integral with the frame, overhanging the frame in spaced relation thereto and adapted to be deflected by the force of compression, a plunger carried by the frame in sliding relation with respect thereto and movable to and from said arm, means carried by the frame and adapted to urge said plunger toward said arm under manual pressure, means carried by said frame for indicating the amount of deflection of said arm, slide means carried by the frame and slidable transversely of said plunger, limit means in said slide means providing variable limits of travel of said plunger, and stop means carried by said plunger and engageable with said limit means, said limit means comprising two non-parallel edges of a slot, said edges extending transverse the direction of movement of said plunger.

5. A device for measuring force at a given value of strain comprising a frame, an arm integral with the frame, overhanging the frame in spaced relation thereto and adapted to be deflected by the force of compression, a plunger carried by the frame in sliding relation with respect thereto and movable to and from said arm, means carried by the frame and adapted to urge said plunger toward said arm under manual pressure, means carried by said frame for indicating the amount of deflection of said arm, slide means carried by the frame and slidable transversely of said plunger, limit means in said slide means providing variable limits of travel of said plunger, and stop means carried by said plunger and engageable with said limit means, said limit means comprising non-parallel edges of a slot inclined to the direction of motion of said slide means in different degrees.

6. A device for measuring force at a given value of strain comprising a frame, an arm integral with the frame, overhanging the frame in spaced relation thereto and adapted to be deflected by the force of compression, a plunger carried by the frame in sliding relation with respect thereto and movable to and from said arm, means carried by the frame and adapted to urge said plunger toward said arm under manual pressure, means carried by said frame for indicating the amount of deflection of said arm, slide means carried by the frame and slidable transversely of said plunger, limit means in said slide means providing variable limits of travel of said plunger, and stop means carried by said plunger and engageable with said limit means, said limit means comprising the non-parallel edges of a slot, said edges inclined to the direction of motion of said slide means in different degrees.

ROY W. BROWN.

REFERENCES CITED

The following references are of record in the file of this patent:

UNITED STATES PATENTS

| Number | Name | Date |
|---|---|---|
| 827,397 | Schauffler | July 31, 1906 |
| 1,187,770 | Nurnberger | June 20, 1916 |
| 1,771,858 | Mohr | July 29, 1930 |
| 1,819,232 | Cropper | Aug. 18, 1931 |
| 1,987,726 | Wilkerson et al. | Jan. 15, 1935 |
| 2,049,644 | Essen | Aug. 4, 1936 |
| 2,466,567 | Williams | Apr. 5, 1949 |

FOREIGN PATENTS

| Number | Country | Date |
|---|---|---|
| 467,276 | Great Britain | June 15, 1937 |
| 575,099 | France | Apr. 12, 1924 |